(12) United States Patent
Chu et al.

(10) Patent No.: US 8,519,960 B2
(45) Date of Patent: Aug. 27, 2013

(54) METHOD AND APPARATUS FOR SWITCHING OF KVM SWITCH PORTS USING GESTURES ON A TOUCH PANEL

(75) Inventors: Hung Chi Chu, Zhonghe (TW); Tsung Yuan Chen, Taipei (TW)

(73) Assignee: Aten International Co., Ltd., Shijr (TW)

( * ) Notice: Subject to any disclaimer, the term of this patent is extended or adjusted under 35 U.S.C. 154(b) by 725 days.

(21) Appl. No.: 12/561,431

(22) Filed: Sep. 17, 2009

(65) Prior Publication Data

US 2011/0063222 A1  Mar. 17, 2011

(51) Int. Cl.
*G06F 3/02* (2006.01)
*G06F 3/033* (2006.01)
*G06F 3/041* (2006.01)

(52) U.S. Cl.
USPC .................. 345/168; 345/163; 345/173

(58) Field of Classification Search
None
See application file for complete search history.

(56) References Cited

U.S. PATENT DOCUMENTS

| | | | |
|---|---|---|---|
| 6,304,895 B1 | 10/2001 | Schneider et al. | |
| 6,539,418 B2 | 3/2003 | Schneider et al. | |
| 6,633,905 B1 | 10/2003 | Anderson et al. | |
| 6,880,002 B2 | 4/2005 | Hirschfeld et al. | |
| 7,028,110 B2 | 4/2006 | Seki et al. | |
| 7,114,018 B1 | 9/2006 | Maity et al. | |
| 7,136,946 B2 | 11/2006 | Shirley | |
| 7,240,111 B2 * | 7/2007 | VanHarlingen et al. | 709/224 |
| 7,246,183 B2 | 7/2007 | Covington et al. | |
| 7,260,624 B2 | 8/2007 | Sivertsen | |
| 7,405,926 B2 | 7/2008 | Wu et al. | |
| 7,774,518 B2 | 8/2010 | Hsueh | |
| 2002/0054029 A1 | 5/2002 | Glancy et al. | |
| 2003/0214487 A1 * | 11/2003 | Morath | 345/173 |
| 2005/0083487 A1 * | 4/2005 | Hunt et al. | 353/30 |
| 2006/0230110 A1 | 10/2006 | VanHarlingen et al. | |
| 2008/0282003 A1 * | 11/2008 | Holovacs et al. | 710/72 |
| 2009/0058818 A1 * | 3/2009 | Chang et al. | 345/173 |
| 2009/0063732 A1 * | 3/2009 | Hayama | 710/36 |
| 2009/0077282 A1 * | 3/2009 | Hsueh | 710/63 |
| 2009/0109205 A1 * | 4/2009 | Mutoh | 345/212 |
| 2010/0060571 A1 * | 3/2010 | Chen et al. | 345/157 |
| 2011/0063222 A1 * | 3/2011 | Chu et al. | 345/168 |

FOREIGN PATENT DOCUMENTS

TW    M343864    11/2008

OTHER PUBLICATIONS

Mouse gestures—definition, http://www.mousegestures.org, pp. 1-2, printed on Oct. 23, 2009.
Office Action issued by the China State Intellectual Property Office on Sep. 11, 2009 in Chinese patent application No. 2008101251088 (counterpart of related U.S. Appl. No. 11/857,507).
APC Analog KVM switch and APC Analog KVM Console Extender Manual, 412005, American Power Conversion, pp. 14-15.

(Continued)

*Primary Examiner* — Peter Vincent Agustin
(74) *Attorney, Agent, or Firm* — Chen Yoshimura LLP

(57) ABSTRACT

A method in a KVM switch system for interacting with the user to switch computer ports using a touch panel device having a touch-sensitive screen is described. The system allows a user to accomplish port switching by "drawing" a symbol (such as an Arabic number) representing a port number on the touch screen, coupled with other actions, such as one or more touches of the screen, an action using another input device such as a mouse, keyboard, buttons, etc., to confirm the port number input.

5 Claims, 3 Drawing Sheets

(56) References Cited

OTHER PUBLICATIONS

Black Box, "KVM drawer with touch screen LCD", http://www.blackbox.com/Store/Detail.aspx/ServView-KVM-Drawer-with-Touch-Screen-LCD-17-LCD/KVT317A-T, 3 pages, printed from the Internet on Sep. 17, 2009. Text is also attached.

Connectpro, "The World's First Touch-screen Sharing KVM Switch", 2009.

* cited by examiner

METHOD AND APPARATUS FOR SWITCHING OF KVM SWITCH PORTS USING GESTURES ON A TOUCH PANEL This application is related to commonly assigned U.S. application Ser. No. 11/857,507, filed Sep. 19, 2007, published on Mar. 19, 2009 as U.S. Pat. Appl. Pub. No. 2009/0077282, now U.S. Pat. No. 7,774,518, which is herein incorporated by reference in its entirety.

BACKGROUND OF THE INVENTION

1. Field of the Invention

This invention relates to a method for switching of KVM (Keyboard, Video, Mouse) switch ports, and in particular, it relates to a method for switching of KVM switch ports based on touch panel input and related devices.

2. Description of the Related Art

In a keyboard, video, mouse (KVM) switch system, generally shown in FIG. 1a, multiple computers 12 are connected to one or more user consoles 11 by a KVM switch 13. The KVM switch 13 has a plurality of computer ports each for connecting to a computer 12, and one or more console ports each for connecting to a user console 11. The KVM switch 13 allows each user console 11 to selectively connect to and control one of the multiple computers 12. When a user console 11 is connected to a selected computer 12, the video signals generated by the selected computer 12 is transmitted by the KVM switch 13 to the user console 11 and displayed on a monitor 11a of the user console 11, and user input signals generated by a user input device of the user console are transmitted by the KVM switch 13 to the selected computer 12 to control it. Thus, the user console 11 can communicate with the selected computer 12 as if the user console is directly connected to that computer.

In addition to communicating with the selected computer 12, the user console 11 can communicate with and control the KVM switch 13. For example, the user using the user console 11 can log on to the KVM switch 13, change the settings of the KVM switch 13, select one of the multiple computers 12 to control, etc. The KVM switch 13 implements an on-screen display (OSD) system to assist the user in communicating with the KVM switch. The OSD system generates images such as menus shown on the monitor 11a of the user console 11, and the user uses the keyboard 11b or mouse 11c to generate input signals for the KVM switch 13 in response to the OSD display.

Each user console 11 includes a display device and a set of input devices. In the example shown in FIG. 1a, the user console 11 includes a video monitor 11a as the display device, and a keyboard 11b and a mouse 11c as the user input devices. In another example, shown in FIG. 1b, the user console 1-110 is a rack-mounted device mounted on a server rack 1-100 and connected to the KVM switch 1-250 which is also rack-mounted. The user console includes a flat panel display 1-110 as the display device, and a keyboard and touch pad combination 1-120 as the user input device. Such a rack-mounted user console is described in commonly owned U.S. Pat. No. 7,405,926.

Touch screens have also been employed in KVM switch systems as the user console. One example is a "KVM drawer with touch screen LCD" made by Black Box. Another example is described in U.S. Patent Application Publication No. 2002/0054029.

SUMMARY OF THE INVENTION

Accordingly, the present invention is directed to a method for inputting a port switch command and related apparatus that substantially obviates one or more of the problems due to limitations and disadvantages of the related art.

An object of the present invention is to provide a convenient input method for inputting a port switch command by drawing a symbol on a touch panel.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a method for switching to a selected computer port of a keyboard, video, mouse (KVM) switch device having a plurality of computer ports, which includes: receiving touch panel input data and recording a touch point movement trail based on the touch panel input data; determining whether the touch point movement trail matches one of a plurality of predefined symbols representing a port number; determining whether a predefined confirmation signal is received; and switching to a computer port corresponding to the one of the plurality of predefined symbols if the predefined confirmation signal is received.

In another aspect, the present invention provides a keyboard, video, mouse (KVM) switch device for connected to a user console, the user console including a touch panel, the KVM switch device including: a console port for connecting to the user console; a plurality of computer ports for connecting to a plurality of computers; a switching circuit for connecting the console port to a selected one of a plurality of computer ports; and a control circuit for controlling the switching circuit, wherein the control circuit receives touch panel input data and records a touch point movement trail based on the touch panel input data, determines whether the touch point movement trail matches one of a plurality of predefined symbols representing a port number, determines whether a predefined confirmation signal is received, and controls the switching circuit to connect the console port to a computer port corresponding to the one of the plurality of predefined symbols if the predefined confirmation signal is received.

In yet another aspect, the present invention provides touch panel device for use with a keyboard, video, mouse (KVM) switch device, including: a touch-sensitive screen; and a control circuit connected to the touch-sensitive screen for processing data generated by the touch-sensitive screen, wherein the control circuit receives touch panel input data and records a touch point movement trail based on the touch panel input data, determines whether the touch point movement trail matches one of a plurality of predefined symbols representing a computer port number, determines whether a predefined confirmation signal is received, and generating a port switch signal for the KVM switch representing the computer port number corresponding to the one of the plurality of predefined symbols if the predefined confirmation signal is received.

In the above method and devices, the predefined confirmation signal may be a signal representing a touch of a predefined confirmation icon displayed on the touch panel, a touch of a predefined key in a keyboard displayed on the touch panel, a predefined number of successive touches on the touch panel within a predefined period of time, or a predefined special symbol drawn on the touch panel; or a signal generated by an input device such an external keyboard, a mouse, a key or button on the touch panel, or a fingerprint scanner.

It is to be understood that both the foregoing general description and the following detailed description are exemplary and explanatory and are intended to provide further explanation of the invention as claimed.

DETAILED DESCRIPTION OF THE PREFERRED EMBODIMENTS

As required, a detailed illustrative embodiment of the present invention is disclosed herein. However, techniques, systems, operating structures and methods in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

Commonly owned U.S. Pat. Appl. Pub. No. 2009/0077282, published on Mar. 19, 2009, describes a method for switching KVM switch ports using a mouse as a user input device. A behavior of the mouse is detected, including the mouse movement trail, one or multiple click on a specific button of the mouse, etc. In one example, when the user moves the mouse to create a mouse movement trail that resembles the Arabic numeral "3", and makes one or more predefined mouse button clicks, the KVM switch switches to the computer port 3. A controller of the mouse transmits position data (coordinates) corresponding to the mouse movement trail to a processing module of the KVM switch, and the processing module recognizes the movement trail to obtain a number corresponding to a computer port number.

Embodiments of the present invention provide a method in a KVM switch system for interacting with the user to switch computer ports using a touch panel device having a touch-sensitive screen. The system allows a user to accomplish port switching by "drawing" a symbol (such as an Arabic number) representing a port number on the touch screen, coupled with other actions (such as one or more touches of the screen, an action using another input device such as a mouse, keyboard, buttons, etc.) to confirm the port number input.

Although there are existing KVM systems which use touch panels as user input devices, these systems require the user to use the touch panel to call out an OSD menu, and select a computer port using the OSD menu. Switching methods according to embodiments of the present invention is more convenient as it eliminates the steps of call out an OSD menu.

Figure 2:
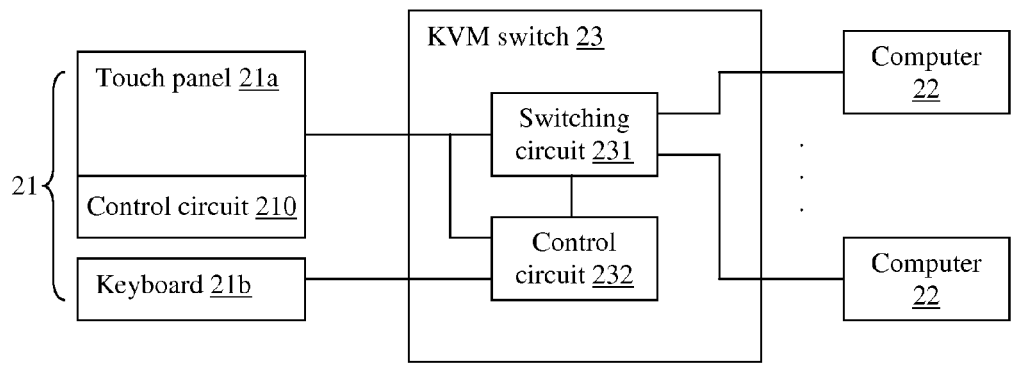
FIG. 2 schematically illustrates a KVM switch system according to an embodiment of the present invention.

FIG. 2 illustrates the KVM switch system. The system includes a KVM switch 23 having a plurality of computer ports and one or more console ports, a plurality of computers 22 each connected to a computer port of the KVM switch 23, and a touch panel 21a connected to a console port of the KVM switch 23. The touch panel 21a has a touch-sensitive screen (such as a LCD screen) which displays images on the screen and detects touching of the screen by a user's finger(s) or other objects. The touch panel includes electrical circuitry and other suitable hardware (collectively shown as 210 in FIG. 2) to control the touch screen and to transmit the input data such as coordinates of the touching points, and/or other data such as processed input data, to the KVM switch 23. In some systems, a keyboard 21b may be provided which, along with the touch panel 21a, constitutes the user console.

Described below are a number of exemplary methods of inputting a port number for port switching according to embodiments of the present invention.

Figure 3:
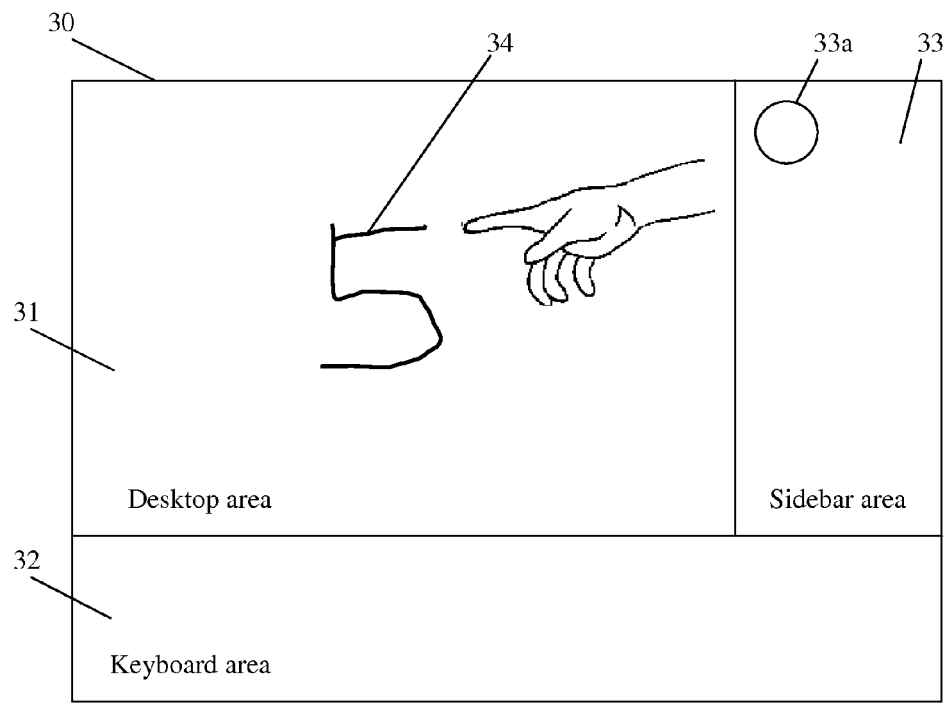
FIG. 3 illustrates an exemplary input method according to an embodiment of the present invention.

FIG. 3 illustrates a first exemplary input method. In this example, the touch screen 30 of the touch panel 21a displays an image that includes three areas. The first area 31 is a desktop area which displays the desktop image of a computer currently selected for control by the user console. This area may include a number of icons, a task bar at the bottom, etc., depending on the computer being controlled. The second area 32 is a keyboard area which displays an image simulating a keyboard, which may be a full alphanumeric keyboard including function keys, arrow keys, etc. The user may touch the keys to input letters and other commands typically keyed in from a keyboard. The third area 33 is a sidebar area which displays a number of icons used to control the KVM switch 23, or any other desirable icons or displays. According to the first embodiment of the present invention, a "confirm port switch" icon (a confirmation icon) 33a is provided in the sidebar area 33.

When the user wishes to switch the computer port to a particular port number, the user touches the desktop area 31 and draws a symbol that represents a port number (e.g. an Arabic numeral "5" as shown in FIG. 3, item 34). The user then touches the "confirm port switch" icon 33a, and the KVM switch switches the computer port to the selected port (port 5 in this example). As a result, the desktop area 31 will now display the desktop of the computer connected to port 5. In this embodiment, only a touch panel 21a is required; a keyboard 21b is not required although it may be optionally provided. The screen display 30 is not required to have the keyboard area 32 but is required to have a confirm icon 33a. Although in FIG. 3 the "confirm" icon 33a is in the sidebar area 33, it may also be provided in the desktop area (i.e. superimposed on the desktop image).

In a second example, instead of touching a "confirm port switch" icon in the sidebar area, the confirmation step may be performed by the user touching a predefined key in the keyboard area 32, such as a function key or a predefined sequence of keys. In this alternative example, the screen display 30 is not required to have a sidebar area 33 or a special "confirm" icon 33a, but is required to have a keyboard area 32.

In a third example, instead of touching an icon 33a in the sidebar 33 or one or more keys in the keyboard area 32, the confirmation step may be performed by a predefined touch action, such as rapidly touching the screen a number of times (e.g., three times) (i.e., a predefined number of successive touches on approximately the same place of the screen within a pre-determined period of time), drawing a predefined special symbol, etc. The repeated touches or the special symbol may occur in the desktop area 31. In this alternative example, the screen display 30 is not required to have a keyboard area 32, a sidebar area 33, or a special "confirm port switch" icon 33*a*.

In a fourth example, the user draws a symbol representing the port number on the touch screen, and then presses a predefined key or sequence of keys on an external keyboard (e.g. keyboard 21*b* in FIG. 2) connected to the KVM switch to confirm the switch action. In this example, the touch screen 30 displays a desktop area 31, but is not required to display a sidebar area 33 or keyboard area 32. The symbol is drawn in the desktop area 31.

In a fifth example, after the user draws the symbol representing the port number on the touch screen, the confirmation step is performed by using a mouse (not shown) connected to the KVM switch, such as pressing a left or right mouse button one or more times.

In a sixth example, after the user draws the symbol representing the port number on the touch screen, the confirmation step is performed by pressing an external key or button on the touch panel 21*a* or the KVM switch 23, other than a keyboard 21*b*.

In a seventh example, after the user draws the symbol representing the port number on the touch screen, the confirmation step is performed by using another external input device of the touch panel 21*a* or the KVM switch 23, such as a fingerprint scanner, etc.

In the above first to seventh examples, when the user draws the symbol, a feedback display may be optionally presented. In other words, the system detects the touch point movement trail, and displays a representation of the trail in a small window on the screen 30, such as in the sidebar area 33. This allows the user to review his touch input in order to determine whether to confirm the input.

In addition, the system may generate an alarm signal when the user makes an error in the input, for example, when the user inputs a port number "17" and confirms the input, but the KVM switch has only sixteen ports. In this situation, the system may display an error message (alarm) on the touch screen to inform the user of the error. The alarm signal may also be in the form of beeps, lights, etc. produced on the touch panel or the KVM switch.

In the above examples, preferably, the confirmation action is effective only when it occurs within a predefined time period after the drawing step. In other words, if the confirmation step does not follow a drawing step within the predefined time period, the input represented by the drawing will be ignored and no switching will occur.

In the above examples, preferably, if the user draws a first symbol, and then, without performing the confirmation action, draws a second symbol and follows it with the confirmation action, the system will ignore the first symbol and accept the second symbol as the touch panel input. The confirmation signal generated by the confirmation action is important as it avoids unintended actions and helps to distinguish the port switch input over other touch screen inputs.

In the above examples, a cancel action may be further defined to generate a cancel signal. The cancel signal may be implemented by, for example, a cancel icon in the sidebar area 33, a cancel key in the keyboard area 32, a predefined touch action on the touch screen, a key press sequence on the external keyboard 21*b*, a mouse action, a key press on an external key or button on the touch panel 21*a* or the KVM switch 23, using another external input device, etc. After the user draws a symbol, the user may perform the cancel action to affirmatively cancel the input.

In the above examples, when drawing the port number symbol on the screen, the user can use any part of the desktop area 31 that is free of desktop icons (e.g., files, folders, shortcuts, etc.). Areas where desktop icons exist should be avoided because when the touch point is over an icon, certain action on the icon (such as moving, highlighting, etc.) may occur as defined by the operating system.

In the above examples, the user does not need to perform any action (such as a screen touch, keyboard or mouse input, button press, etc.) before drawing the port number symbol. Alternatively, the input method may be designed so that the user first performs a predefined preparatory action using the touch panel, a keyboard, a mouse, or other input devices, and then draws the port number symbol within a predefined time period after the preparatory action. A disadvantage of requiring a preparatory action is that it increases the number of steps the user has to go through. An advantage of requiring a preparatory action is that it will minimize the problem of misinterpreting the touch input. For example, if a preparatory action is received, the control program will interpret the subsequent touching input (within the predefined time period) as a port switching input rather than normal operating system action. This will allow the user to touch over desktop icons when drawing the port number symbol without affecting the icons. This may be convenient when the desktop is crowded with icons. As another alternative, the user may be allowed to draw the port number symbol with or without a preparatory action; when the preparatory action is performed, the user can draw over desktop icons without affecting them.

In the above descriptions, the embodiments of the invention are described from the perspective of user experience and the behavior of the system. Some aspects of the behavior of the system can be implemented using known technologies and the implementation will not be described in detail here. For example, the touch screen and the hardware and software for detecting touch input can be implemented using known technologies. Recognition of handwriting such as the port number symbols drawn on the touch screen 30 can be implemented using known technologies. The keyboard and sidebar displays 32 and 33 may be implemented by combining video signals from the selected computer 22 and video signals generated within the KVM switch 23 using known technologies. Of course, in addition to currently know technologies, suitable technologies developed in the future may also be used to implement these aspects.

In the KVM switch 23, one or more circuits 231 are provided for switching the computer ports, i.e. to connect a selected computer 22 to the console 21 (which includes the touch panel 21*a* and optionally the keyboard 21*b*). The switching circuits 231 transmits video signals from the selected computer 22 to the touch panel 21*a*, and input signals from the console 21 to the selected computer 22. The switching circuits may be implemented by any suitable technologies, including a cross point switch, logical circuits, etc.

The KVM switch 23 also includes a control circuit 232, which receives the input signals from the touch panel 21*a* and controls the switching actions of the switching circuit 231.

The behavior of the system is controlled by software or firmware, which may be executed by processors in the touch panel 21, in the KVM switch 23, in a separate control unit (not shown in FIG. 2) connected to the touch panel or the KVM switch, or in a combination of these components in a distributed manner. Alternatively, the behavior of the system may also be controlled by hardware such as logical circuits located in the above components. Hereinafter, the software, firmware or hardware that controls the behavior of the KVM switch system is collectively referred to as the control program or control section for convenience.

Figure 4:
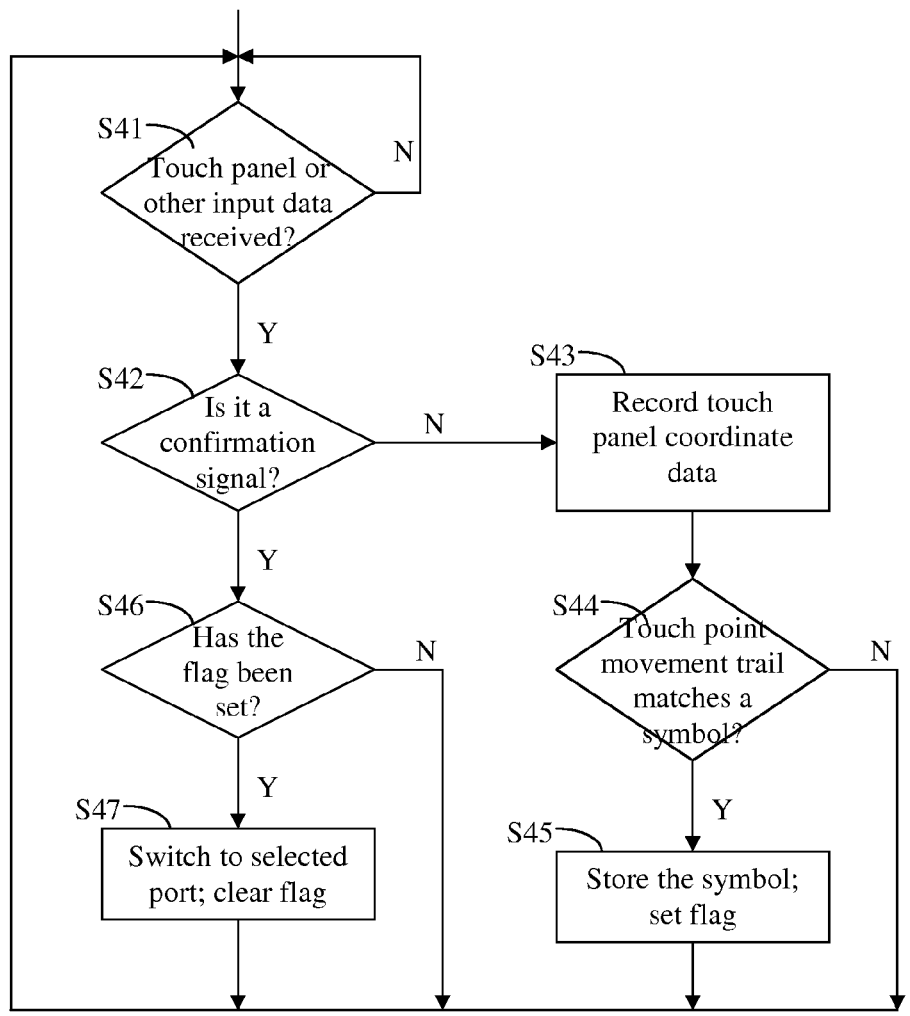
FIG. 4 schematically illustrates a process for recognizing a port number symbol drawn on the touch screen to control port switching according to an embodiment of the present invention.

FIG. 4 schematically illustrates a process performed by the control program or control section for recognizing the port number symbol drawn on the touch screen and for controlling the switching of computer ports.

The control program continuously checks for touch panel data received from the touch panel 21a and other data received from other input devices such as the keyboard, mouse, buttons, etc. (step S41). The touch panel 21a is equipped with control software, firmware and/or hardware to generate touch point data, including coordinates of the touch points, etc. The control program records a timing of touch points coordinate data, and based on the touch point data and timing data, generate input events (gestures) such as click, movement trail, etc. The data from other input devices will be data related to the confirmation action described earlier. If the confirmation action is performed by using the touch panel 21a, then step S41 will only need to check for touch panel data.

If the control program does not receive touch panel or other input data ("N" in step S41), it continues to wait for data. If the control program receives touch panel or other input data ("Y" in step S41), it determines whether the data is a confirmation signal generated by a confirmation action (step S42). The various forms of confirmation actions are described earlier. If the touch panel data or other input data is not a confirmation signal ("N" in step S42), the control program records the touch panel coordinate data received in step S41 (step S43).

The control program then determines whether the touch point movement trail received so far matches one of a plurality of predefined symbols representing a port number (i.e., one or more Arabic numerals) (step S44). In step S44, the control program will use coordinate data received up to that time to determine the touch point movement trail. Any suitable algorithm for handwriting character recognition may be used in this step. In addition to recognizing whether the touch point movement trail constitutes a symbol (e.g. an Arabic numeral, a character, etc.), this step also determines whether the recognized character corresponds to a valid port number of the KVM switch. For example, if the KVM only has 8 ports and the touch point movement trail is recognized as an Arabic numeral 9, then the determination would be "No".

If the touch point movement trail matches a symbol for a port number ("Y" in step S44), the symbol is stored and a flag is set to indicate the input is recognized as a port number (step S45), and the control program returns to step S41 to wait for the next touch panel input or other input data. This flag may be referred to as an "input complete" flag for ease of reference. If in step S44 the touch point movement trail does not match a symbol for a port number ("N" in step S44), the control program returns to step S41 without setting the flag.

In step S42, if the touch panel input or other input data is a confirmation signal ("Y" in step S42), the control program checks whether the flag has been set (step S46). As mentioned earlier, the flag is set if the touch point movement trail matches a symbol for a port number. If the flag has not been set ("N" in step S46), the conformation signal is ignored and the program returns to step S41 to wait for the next input data.

In step S46, if the flag has been set ("Y" in step S46), the control program controls the KVM switch 23 (e.g. via the switching circuit 231) to switch to the computer port represented by the symbol (step S47). The flag is cleared in this step (step S47). Then, the control program returns to step S41 to wait for the next input data.

As mentioned earlier, in some embodiments, a feedback displayed is displayed in a small window. In such embodiments, a step of displaying the touch point coordinate data is added before or after step S43. This step includes converting the touch panel coordinate data into coordinate of the small feedback display window and displaying it.

As mentioned earlier, in some embodiments, the program displays an error signal to the user when a confirmation signal is received but a valid port number input has not been received. In such embodiments, a step of generating an error signal will be added between step S46 and step S41.

As mentioned earlier, in some embodiments, the confirmation action is effective only when it occurs within a predefined time period after the drawing step. To implement this, after a "Yes" determination in step S42, or after the "Yes" determination in step S46, a step is added to determine whether the confirmation signal is within the predefined time period from the time of the last touch panel coordinate input or from the time when the flag was set. If the confirmation signal is outside of the predefined time period, step S47 will not be performed and the flag will be cleared.

As mentioned earlier, in some embodiments, if the user draws a first symbol, and then, without performing the confirmation action, draws a second symbol and follows it with the confirmation action, the system will ignore the first symbol and accept the second symbol as the touch panel input. To implement this, in step S45, the control program will store the latest symbol and delete or ignore any previously stored symbol.

As mentioned earlier, in some embodiments, a cancel action may be defined to generate a cancel signal. To implement this, a "cancel" determination step may be added after the "Yes" determination in step S41 and before step S42. If this determination step determines that the input data is a cancel signal, the control program will clear any flag or previously stored touch point movement trail or symbol, and return to step S41. If the input data is not a cancel signal, the control program will continue to step S42. Alternatively, the "cancel" determination step may be added after the "No" determination in step S42 and before step S43.

As mentioned earlier, in some embodiments, the user is required to perform a predefined preparatory action and then draw the port number symbol within a predefined time period after the preparatory action. To implement this, after the "Yes" determination in step S41, a step is added to determine whether the input data represents a preparatory action; if the answer is Yes, another flag (which may be referred to as a "preparatory flag" for ease of reference) is set. Further, steps S42 to S47 will be performed only if the preparatory flag had been set within a predefined time period preceding the input data.

As mentioned earlier, the above process is performed by a control program or control section which may be located in various parts of the KVM system. In one example, all of steps S41 to S47 are executed by the control circuit 232 in the KVM switch 23. In another example, steps S41 to S46 are performed by the touch panel 21a (e.g. by the control circuit 210), and in step S47, rather than "switch selected port", the touch panel will generate a port switch signal and send it to the KVM switch 23 to switch the port. In yet another example, steps S41 to S46 are performed by a control device separate from both the touch panel 21a and the KVM switch 23, and in step S47, this control device will send a switch signal to the KVM switch to switch the port.

All of the signals described above are electrical signals or other signals generated by hardware circuits.

Figure 1A:
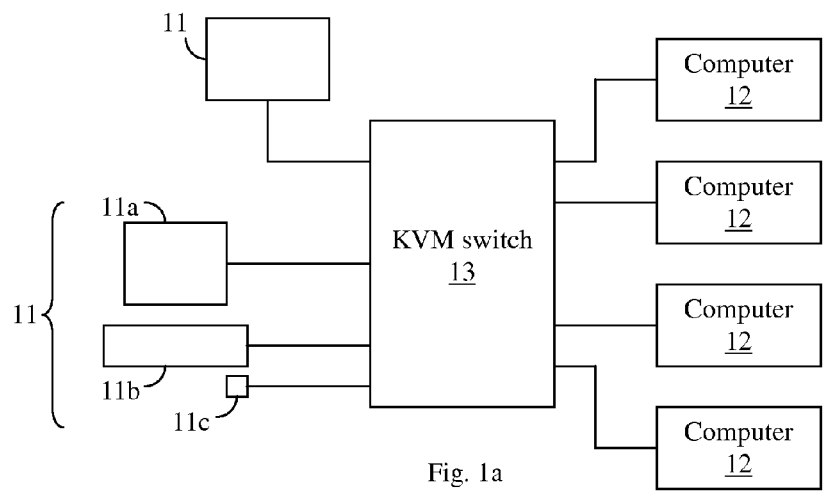
FIG. 1a schematically illustrates a conventional KVM switch system.
Figure 1B:
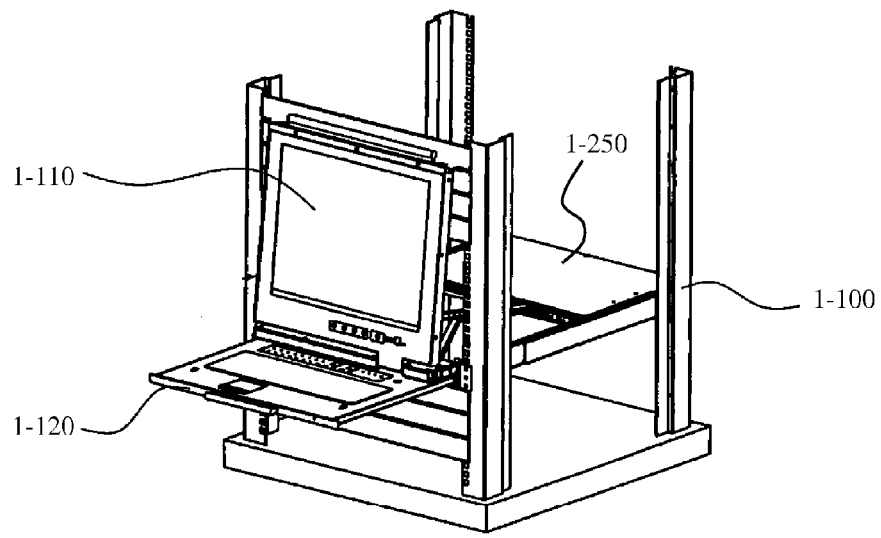
FIG. 1b illustrates a conventional rack-mounted KVM switch system.

The port switching method described above may be used in a KVM switch system where the user console is desktop console with a touch panel, a keyboard and a mouse, a rack-mounted console, including a single rail and dual rail rack-mounted systems, a hand-held console, or any other suitable types of console devices. A rack-mounted console may generally resemble the console shown in FIG. 1b, but with the flat panel display 1-110 replaced by a touch panel. In the above systems, the touch panel is typically an LCD panel, but may also be other types of panels.

It will be apparent to those skilled in the art that various modification and variations can be made in the touch panel data input and port switching method and related apparatus of the present invention without departing from the spirit or scope of the invention. Thus, it is intended that the present invention cover modifications and variations that come within the scope of the appended claims and their equivalents.

What is claimed is:

1. A method for switching to a selected computer port of a keyboard, video, mouse (KVM) switch device having a plurality of computer ports, comprising:
   receiving touch panel input data and recording a touch point movement trail based on the touch panel input data;
   determining whether the touch point movement trail matches one of a plurality of predefined symbols representing a port number;
   determining whether a predefined confirmation signal is received, wherein the predefined confirmation signal represents either a touch of a predefined confirmation icon displayed on the touch panel, or a touch of a predefined key in a keyboard displayed on the touch panel, or a predefined special symbol drawn on the touch panel; and
   switching to a computer port corresponding to the one of the plurality of predefined symbols if the predefined confirmation signal is received.

2. A keyboard, video, mouse (KVM) switch device for connected to a user console, the user console including a touch panel, the KVM switch device comprising:
   a console port for connecting to the user console;
   a plurality of computer ports for connecting to a plurality of computers;
   a switching circuit for connecting the console port to a selected one of a plurality of computer ports; and
   a control circuit for controlling the switching circuit, wherein the control circuit receives touch panel input data and records a touch point movement trail based on the touch panel input data, determines whether the touch point movement trail matches one of a plurality of predefined symbols representing a port number, determines whether a predefined confirmation signal is received, wherein the predefined confirmation signal represents either a touch of a predefined confirmation icon displayed on the touch panel, or a touch of a predefined key in a keyboard displayed on the touch panel, or a predefined special symbol drawn on the touch panel, and controls the switching circuit to connect the console port to a computer port corresponding to the one of the plurality of predefined symbols if the predefined confirmation signal is received.

3. The KVM switch device of claim 2, wherein the touch panel is an integral part of the KVM switch device.

4. The KVM switch device of claim 3, wherein the KVM switch device with the integrated touch panel is a rack-mounted device.

5. A touch panel device for use with a keyboard, video, mouse (KVM) switch device, comprising:
   a touch-sensitive screen; and
   a control circuit connected to the touch-sensitive screen for processing data generated by the touch-sensitive screen, wherein the control circuit receives touch panel input data and records a touch point movement trail based on the touch panel input data, determines whether the touch point movement trail matches one of a plurality of predefined symbols representing a computer port number, determines whether a predefined confirmation signal is received, wherein the predefined confirmation signal represents either a touch of a predefined confirmation icon displayed on the touch panel or a touch of a predefined key in a keyboard displayed on the touch panel or a predefined special symbol drawn on the touch panel, and generating a port switch signal for the KVM switch representing the computer port number corresponding to the one of the plurality of predefined symbols if the predefined confirmation signal is received.

* * * * *